United States Patent
Stolle

(10) Patent No.: US 10,350,958 B2
(45) Date of Patent: Jul. 16, 2019

(54) MOTOR VEHICLE CHASSIS

(71) Applicant: HOERBIGER AUTOMOTIVE KOMFORTSYSTEME GmbH, Schongau (DE)

(72) Inventor: Klaus Stolle, Altenstadt (DE)

(73) Assignee: HOERBIGER AUTOMOTIVE KOMFORTSYSTEME GMBH, Schongau (DE)

( * ) Notice: Subject to any disclaimer, the term of this patent is extended or adjusted under 35 U.S.C. 154(b) by 0 days.

(21) Appl. No.: 15/616,081

(22) Filed: Jun. 7, 2017

(65) Prior Publication Data
US 2017/0267050 A1 Sep. 21, 2017

Related U.S. Application Data

(63) Continuation of application No. PCT/EP2015/079766, filed on Dec. 15, 2015.

(30) Foreign Application Priority Data

Dec. 19, 2014 (DE) ........................ 10 2014 018 788

(51) Int. Cl.
*B60G 17/056* (2006.01)
*B60G 17/027* (2006.01)
*B60G 15/06* (2006.01)

(52) U.S. Cl.
CPC ......... *B60G 17/056* (2013.01); *B60G 15/063* (2013.01); *B60G 17/0272* (2013.01);
(Continued)

(58) Field of Classification Search
CPC ................ B60G 17/056; B60G 15/063; B60G 17/0272; B60G 2202/312; B60G 2202/32;
(Continued)

(56) References Cited

U.S. PATENT DOCUMENTS 5,181,696 A 1/1993 Abe
6,422,127 B1 * 7/2002 Huber .................... B62D 25/12
137/516.27
(Continued)

FOREIGN PATENT DOCUMENTS

DE 32 23 195 A1 12/1983
DE 10 2007 051 971 A1 5/2009
(Continued)

OTHER PUBLICATIONS

International Search Report issued for corresponding International Patent Application No. PCT/EP2015/079766 dated Mar. 18, 2016.
(Continued)

*Primary Examiner* — Paul N Dickson
*Assistant Examiner* — Hilary L Johns
(74) *Attorney, Agent, or Firm* — Myers Wolin, LLC

(57) ABSTRACT

A hydraulic level-adjustment device has a reservoir, a reversible hydraulic unit with a hydraulic pump, and a single-acting hydraulic linear actuator. To lift a vehicle chassis, the working space of the linear actuator can be pressurized by the hydraulic pump operated in its first pumping direction via its first pump connection and a fill line with a fill-check valve arranged therein. To lower the chassis, via its second pump connection, the hydraulic pump, operated in the reverse pumping direction, pumps hydraulic fluid into the reservoir via an outflow line with a throttle unit arranged therein. The pressure present upstream of the throttle unit acts on the control connection of a lockable, drainage-check valve via a control line and opens same, so that, under the weight of the motor vehicle, hydraulic fluid is forced out of the working space of the hydraulic linear actuator into the reservoir via the drainage line.

10 Claims, 4 Drawing Sheets

(52) U.S. Cl.
CPC .... *B60G 2202/312* (2013.01); *B60G 2202/32* (2013.01); *B60G 2202/415* (2013.01); *B60G 2202/416* (2013.01); *B60G 2204/124* (2013.01); *B60G 2500/203* (2013.01); *B60G 2500/32* (2013.01)

(58) Field of Classification Search
CPC ........ B60G 2202/415; B60G 2202/416; B60G 2204/124; B60G 2500/203; B60G 2500/32; B62K 2025/044; B62K 2025/045
USPC ........................................................ 180/165
See application file for complete search history.

(56) References Cited

U.S. PATENT DOCUMENTS

2010/0072760 A1    3/2010   Anderson et al.
2016/0023711 A1*   1/2016   Mochizuki ......... B60G 17/0272
                                                          280/6.157

FOREIGN PATENT DOCUMENTS

| | | | |
|---|---|---|---|
| DE | 10 2009 047 100 A1 | 5/2011 | |
| EP | 1 101 692 A2 | 5/2001 | |
| EP | 1101692 A2 * | 5/2001 | ............. B62D 25/12 |
| EP | 2 301 773 A1 | 3/2011 | |
| JP | 02081786 A | 3/1990 | |
| JP | 2010-149550 A | 7/2010 | |
| WO | 2014/142160 A1 | 9/2014 | |
| WO | WO-2014142160 A1 * | 9/2014 | ......... B60G 17/0272 |

OTHER PUBLICATIONS

International Preliminary Report on Patentability issued for corresponding International Patent Application No. PCT/EP2015/079766 dated Mar. 20, 2017 with an English translation retrieved from www.wipo.int/patentscope/en/website on Jun. 29, 2017.

* cited by examiner

MOTOR VEHICLE CHASSIS

CROSS REFERENCE TO RELATED APPLICATIONS

This application is a continuation under 35 U.S.C. § 120 of International Application PCT/EP2015/079766, filed Dec. 15, 2015, which claims priority to German Application 10 2014 018 788.8, filed Dec. 19, 2014, the contents of each of which are incorporated by reference herein.

FIELD OF THE INVENTION

The present invention relates to a motor vehicle chassis, comprising a base structure and a multiplicity of wheels connected therewith via respectively one wheel suspension, wherein each wheel suspension has at least one spring and wherein further a hydraulic level-adjusting device is allocated at least to one wheel suspension.

BACKGROUND

It is known to equip motor vehicles with a level-adjusting device, for example in order to increase the ground clearance if necessary. Typically, although not necessarily, this adjusting device engages in one of the foot points of the spring of the wheel suspension in question and changes it, but in principle it is not decisive whether the spring foot point allocated to the base structure or else that allocated to the wheel in question is adjusted. Besides pneumatic and electrical spring foot point adjusting drives (see, for example, DE 102007051971 B4), especially hydraulic spring foot point adjusting drives are also known, for example from DE 3223195 A1, DE 102009047100 A1, U.S. Pat. No. 5,181, 696 A, EP 2301773 A1, JP 2010-149550 A and WO 2014/142160 A1.

Several of the hydraulic level-adjusting systems are based on the approach (which is entirely logical) that only raising of the base structure of the vehicle takes place actively, i.e. by hydraulic energy, whereas the vehicle's own weight is used for lowering the bottom structure, in order to force the hydraulic fluid from the working space of a linear actuator (which accordingly is of only single-acting construction) via an opened return-flow line back into the reservoir. This is the case in particular for the system according to WO 2014/142160 A1, which discloses motor-vehicle chassis of the type mentioned in the introduction that has been particularly highly developed in this respect. Therein the hydraulic level-adjusting device comprises a single-acting hydraulic linear actuator, the working space (which can be pressurized in order to raise the base structure) of which is in communication with a (first) pump port of the pump of a hydraulic power pack via a line and valve arrangement. In order to hold the base structure of the motor vehicle reliably in its raised position without energy consumption, a shutoff valve, which has a valve piston biased by means of a closing spring in a shut-off position of the valve, is provided between this hydraulic power pack and the linear actuator. By pressurizing a valve working space allocated to it, the valve piston can be displaced against the force of the closing spring and in this way the shutoff valve can be opened, in order to drain the hydraulic fluid from the linear actuator and in this way to lower the base structure of the chassis. The hydraulic power pack is reversible, so that it can be switched between two delivery directions. The line and valve arrangement places the second pump port in communication with the valve working space of the shutoff valve and in addition comprises a 3/3-way valve placing the two pump ports in communication with one another, while its third port is in communication with the reservoir. The 3/3-way valve is biased by spring-loading in a shut-off position, from which, when actuated as a function of control pressure, it connects either the first or the second pump port to the reservoir.

In practice, however, the motor-vehicle chassis disclosed in WO 2014/142160 A1 and equipped with a hydraulic level-adjusting device does not achieve satisfactory results, despite the considerable equipment complexity. For example, only partial lowering of the chassis from its raised position is not possible or is possible only in complex manner; for example, to enable the return flow of hydraulic fluid from the working space of the linear actuator into the reservoir by means of the hydraulically opened shutoff valve, the piston of the shutoff valve is displaced—by pressurizing the working space in question of the shutoff valve for reversed delivery direction of the pump—against the force of the holding spring, and so the shutoff valve remains open until the delivery direction of the pump is changed once again, i.e. until the pump is again being operated with its first delivery direction and—with simultaneous pressurization of the working space of the linear actuator and hereby raising of the base structure of the chassis—the pilot-to-open check valve connected between the second pump outlet and the valve working space of the shutoff valve opens.

In view of the disadvantages of the prior art shown in the foregoing, an object of the present invention is to provide a motor-vehicle chassis of the type mentioned in the introduction that is characterized by improved practical utility, specifically while also reducing the equipment complexity compared with the prior art.

SUMMARY

The object explained in the foregoing is achieved by the motor-vehicle chassis specified in claim 1. Accordingly, the motor-vehicle chassis with hydraulic level-adjusting device is characterized by the following features, which cooperate functionally in synergistic manner: The hydraulic level-adjusting device comprises a reservoir for hydraulic fluid, a hydraulic power pack with a hydraulic pump driven by an electric motor and having two pump ports, a single-acting hydraulic linear actuator as well as a line and valve arrangement placing the reservoir, the hydraulic pump and the linear actuator in communication with one another. To raise the base structure, the working space of the linear actuator can be pressurized by the hydraulic pump, for which purpose a first pump port, via a filling line with a filling check valve disposed therein, is in communication with the working space of the hydraulic linear actuator. The hydraulic power pack is reversible, with a reversible delivery direction between the two pump ports. The two pump ports are in communication with the reservoir via a shuttle valve. The second pump port is in communication with the reservoir via a discharge line with a throttle unit disposed therein. And a control line places the control port of a pilot-to-open drainage check valve, which is disposed in a drainage line placing the working space of the hydraulic linear actuator in communication with the reservoir, in communication with the discharge line between the second pump port and the throttle unit.

Besides the circumstance that the level-adjusting device provided in the chassis is able to work without any kind of externally controlled valve, i.e. especially without any electrically activated valve, a particular characteristic of the chassis is that a pure discharge line is connected to the second pump port. This contributes substantially to the particular usability of the chassis, and does so in synergistic cooperation with the further features determining for this purpose. In contrast to what happens for the prior art according to WO 2014/142160 A1, the hydraulic power pack, when in its reversed second delivery direction, does not deliver to a consuming component receiving hydraulic fluid (such as a working space or the like); to the contrary, in this mode of operation the hydraulic power pack pumps the delivered hydraulic fluid through the discharge line—against the resistance of the flow throttle—completely back into the reservoir, except for the (minimal) volume of hydraulic fluid that during startup of the hydraulic pump is passed in its second delivery direction via the control line to the control part of the pilot-to-open drainage check valve disposed in the drainage line, in order to open it, i.e. to switch it to passing condition. Furthermore, it is characteristic of the present embodiments that the second pump port is connected directly to the control port of the pilot-to-open drainage check valve disposed in the drainage line, in the sense that the hydraulic pressure prevailing at the second pump port is constantly present at the control port of the pilot-to-open drainage check valve. Hereby the disadvantages explained in the foregoing with regard to the chassis according to WO 2014/142160 A1 can be avoided; and on the whole, a reliably operating and optimally manipulable level-adjusting device is obtained with remarkably small equipment complexity.

A first preferred embodiment is characterized in that a flow throttle, i.e. a separate throttle element independent of the throttling behavior of the pilot-to-open drainage check valve, is disposed in the drainage line. This flow throttle, or properly speaking its throttling behavior, is determining for the dynamics of lowering of the chassis when the hydraulic pump is switched to its second delivery direction and the pilot-to-open drainage check valve is opened hereby. In this way, lowering of the chassis can be optimized without having to allow for the flow situation within the pilot-to-open drainage check valve, which in turn may therefore be optimized in terms of its function of holding the chassis at its respectively adjusted level.

In fact, it is favorable from a large number of viewpoints for fluid to be passing through the pilot-to-open drainage check valve (opened in controlled manner) exclusively during lowering of the chassis; after all, since the hydraulic fluid being discharged through the opened drainage check valve is discharged directly into the reservoir in this case, fluidic feedback, which is detrimental under unfavorable conditions (e.g. pressure pulses), to the first pump port and/or to the shuttle valve is precluded. However, such a design is in no way imperative. To the contrary, within the scope of a particularly preferred improvement, especially with regard to the necessary installation space and the number of components, it is also entirely possible for a hydraulic working line to form both a portion of the filling line and a portion of the drainage line, in which case a pilot-to-open check valve disposed in the hydraulic working line forms both the filling check valve and the pilot-to-open drainage check valve.

According to yet another preferred embodiment, the pilot-to-open check valve disposed in the hydraulic working line of the special embodiment of the embodiment explained in the foregoing is constructed in two stages, with two individual valves connected in series and having control ports connected in parallel. The redundancy achieved in this way by the said valve group permits the use of comparatively inexpensive pilot-to-open check valves without detrimental effects on the whole for the reliability of the level-adjusting device.

According to yet another preferred improvement, a valve group (which is disposed in the hydraulic working line, i.e. once again through which fluid passes both during raising and lowering) with a pilot-to-open check valve and a throttle check valve connected thereto in series may be provided instead of the valve group described in the foregoing, with two pilot-to-open check valves connected in series and having control ports connected in parallel. This throttle check valve takes over the function of the flow throttle, already mentioned hereinabove, disposed in the drainage line.

Preferably the line and valve arrangement comprises an emergency drainage line, which places the working space of the hydraulic linear actuator in communication with the discharge line and in which a manually actuatable shutoff valve is connected. In the event of failure of the hydraulic power pack or of some other malfunction, the chassis can be lowered by manually opening the said shutoff valve, whereupon the hydraulic fluid confined in the working space of the hydraulic linear actuator is drained via the discharge line into the reservoir. Preferably, this emergency drainage line connects into the discharge line upstream from the throttle unit disposed therein.

According to yet another particularly preferred improvement, the throttle unit disposed in the discharge line comprises an orifice. Hereby pressure equalization between the control port of the pilot-to-open drainage check valve and the reservoir is ensured—via the orifice—while the system is idle. Of course, instead of the orifice (or possibly in addition thereto), the throttle unit may comprise a pressure-limiting valve.

In the sense of the particularly advantageous aspect already mentioned hereinabove, to the effect that the level-adjusting device provided in the chassis is able to work without any externally controlled valve, i.e. especially without any kind of electrically activated valve, the shuttle valve is particularly preferably constructed to be self-sufficient, without any activation imposed by external energy. In particular, and in contrast to the 3/3-way valve provided according to WO 2014/142160 A1, the shuttle valve, which is therefore controlled solely by the pressures present therein, does not have any shut-off position, and so at least one of the two pump ports is constantly in communication with the reservoir via the shuttle valve.

The design features of the level-adjusting device provided in chassis, especially the possibility of a particularly compact construction with only minimum dimensions, make the hydraulic adjusting device particularly suitable for integration into the respective wheel suspension. In this sense, the respective hydraulic adjusting device is preferably disposed completely on the wheel suspension in questions, which also means in particular that each wheel suspension equipped with a hydraulic level-adjusting device is allocated its own hydraulic power pack.

BRIEF DESCRIPTION OF THE DRAWING

The present invention will be explained in more detail hereinafter on the basis of several preferred exemplary embodiments illustrated in the drawing, wherein.

DETAILED DESCRIPTION OF THE PREFERRED EMBODIMENTS

Figure 1:
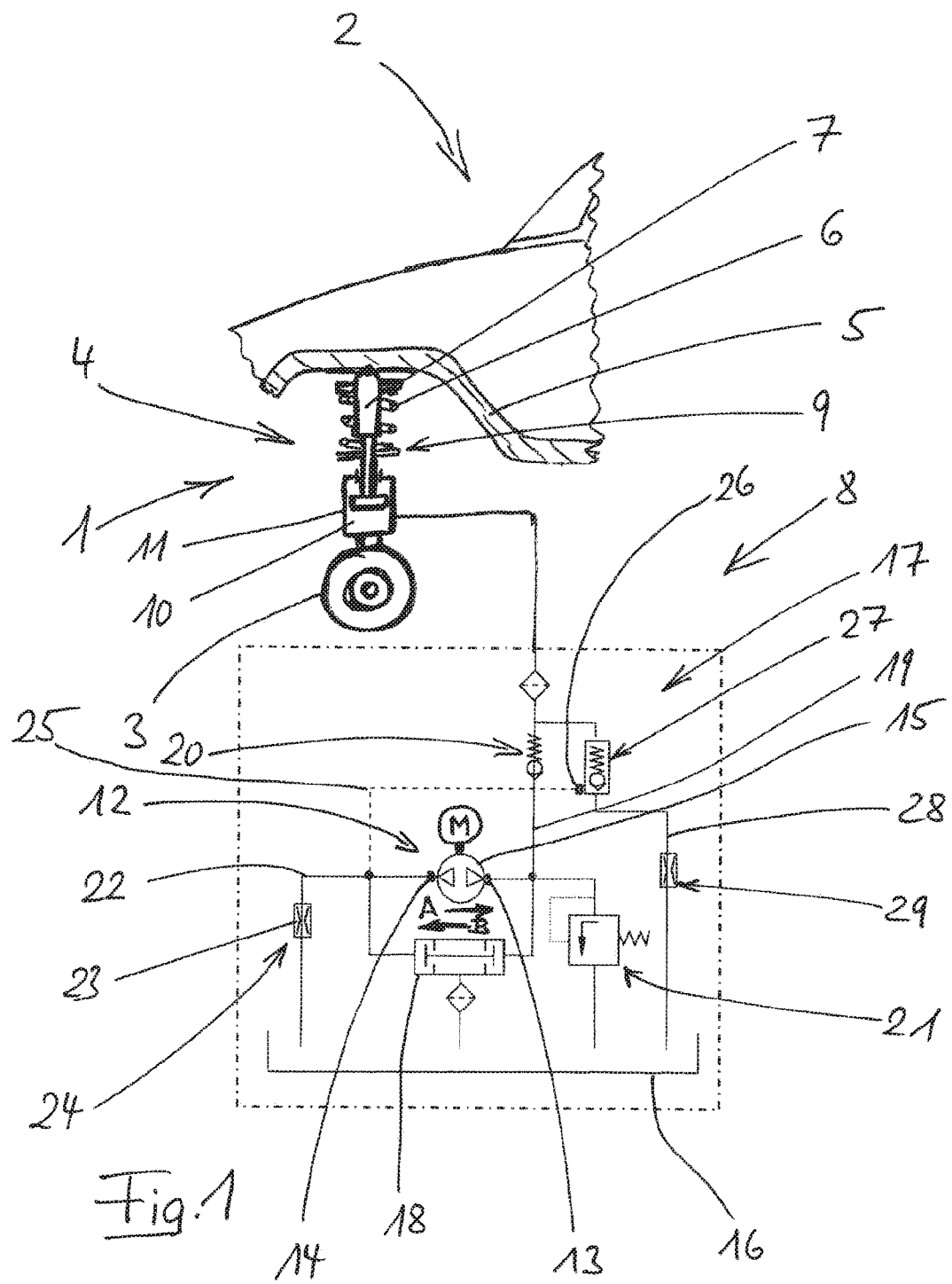
FIG. 1 shows, partly schematically, a motor vehicle wherein its chassis is equipped with a hydraulic level-adjusting device according to a first preferred embodiment of the present invention.

According to FIG. 1, chassis 1—illustrated only schematically in view of the prior art existing in this respect (see above)—of a motor vehicle 2 has several wheels 3, which are respectively connected via a wheel suspension 4 with a base structure 5. This wheel suspension 4 respectively comprises a spring 6 and other standard components, such as a shock absorber 7, for example.

Hydraulic level-adjusting device 8, shown in detail in FIG. 1 and intended in particular for structural integration into wheel suspension 4, comprises a single-acting hydraulic linear actuator 11, which has a working space 10 and which in a way known as such brings about the change of foot point 9 (on the wheel side, for example) of spring 6 of wheel suspension 4, a reversible hydraulic power pack 12 with a hydraulic pump 15 driven by an electric motor M and having a first pump port 13 and a second pump port 14, a reservoir 16 for hydraulic fluid and a line and valve arrangement 17 placing reservoir 16, hydraulic pump 15 and linear actuator 11 in communication with one another. First pump port 13 and second pump port 14 are in communication with reservoir 16 via a shuttle valve 18. This shuttle valve 18 is of self-contained construction; in the event that a pressure difference exists between the two pump ports 13, 14, the pump port with lower pressure level communicates with reservoir 16 via shuttle valve 18, whereas the pump port with higher pressure level is shut off from reservoir 16.

To raise base structure 5 of chassis 1, working space 10 of linear actuator 11 can be pressurized by hydraulic pump 15 (operated with first delivery direction A). For this purpose, first pump port 13 is placed in communication with working space 10 of hydraulic linear actuator 11 via a filling line 19. And hydraulic pump 15 aspirates hydraulic fluid out of reservoir 16 via second pump port 14 and shuttle valve 18. A filling check valve 20 is disposed in filling line 19. This prevents reverse flow of fluid through filling line 19. Furthermore, a pressure-limiting valve 21 is provided, which prevents an inadmissibly high pressure rise in filling line 19 by opening communication between first pump port 13 and reservoir 16 if a specified pressure level is exceeded.

If the desired level of chassis 1 is reached, hydraulic pump 15 stops. The hydraulic fluid pumped into working space 10 of linear actuator 11 remains confined therein.

To lower chassis 1, hydraulic pump 15 is operated with reversed, second delivery direction B. Shuttle valve 18 is reversed. Hydraulic pump 15 now aspirates hydraulic fluid from reservoir 16 via first pump port 13 and shuttle valve 18 and delivers it back to reservoir 16 via second pump port 14 and a discharge line 22 with a throttle unit 24 disposed therein and having the form of an orifice 23. Via a control line 25, which places discharge line 22 in communication with control port 26 of a pilot-to-open drainage check valve 27, the dynamic pressure existing in discharge line 22 upstream from orifice 23 is switched to control port 26 of the pilot-to-open drainage check valve 27. The corresponding drainage check valve 27 opens. And the hydraulic fluid present in working space 10 of hydraulic linear actuator 11 is forced—under the weight of motor vehicle 2—via drainage line 28, which places working space 10 of hydraulic linear actuator 11 in communication with reservoir 16 and in which pilot-to-open drainage check valve 27 is disposed, into reservoir 16. The return flow through drainage line 28—and thus the rate of lowering of chassis 1—is limited in this case by a flow throttle 29 disposed in drainage line 28.

If the desired level is reached, hydraulic pump 15 stops. Drainage check valve 27 closes. And the hydraulic fluid left in working space 10 of linear actuator 11 remains confined therein. From this position, chassis 1 may be further lowered if necessary in the manner described in the foregoing or may be raised once again.

Figure 2:
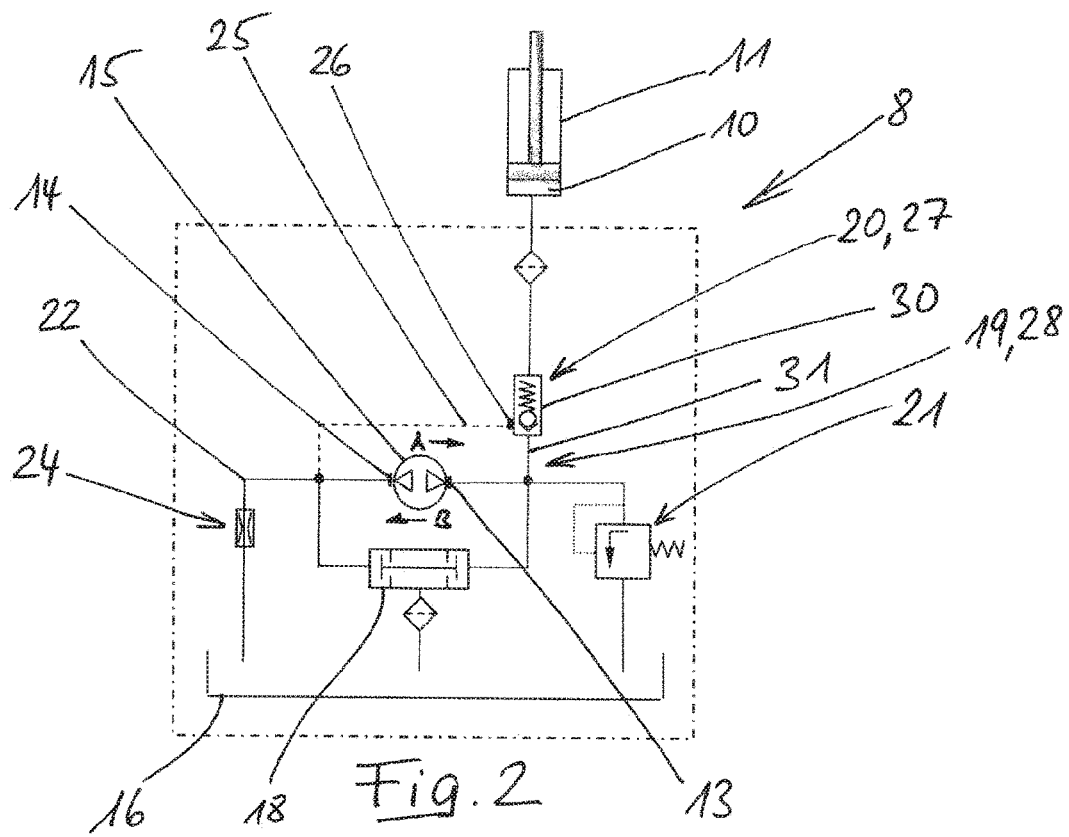
FIG. 2 shows a second preferred embodiment of a hydraulic level-adjusting device of a motor-vehicle chassis constructed according to the present invention.

FIG. 2 illustrates a modification of hydraulic level-adjusting device 8 of a motor-vehicle chassis 1 shown in FIG. 1, to the effect that two valves structurally separated according to FIG. 1, namely filling check valve 20 and pilot-to-open drainage check valve 27 are combined as a single pilot-to-open check valve 30 encompassing both functions. This corresponding pilot-to-open check valve 30 is disposed in a hydraulic working line 31, which forms both a portion of filling line 19 and a portion of drainage line 28. The function of hydraulic level-adjusting device 8 shown in FIG. 2 corresponds to that of hydraulic level-adjusting device 8 according to FIG. 1, providing that, during lowering of chassis 1 (with opened check valve 30), the hydraulic fluid is forced out of working space 10 of linear actuator 11 via hydraulic working line 31 and shuttle valve 18 into reservoir 16. Part of this hydraulic fluid forced out of working space 10 of linear actuator 11 is aspirated by hydraulic pump 15 via its first pump port 13 and delivered via discharge line 22 into reservoir 16.

Figure 3:
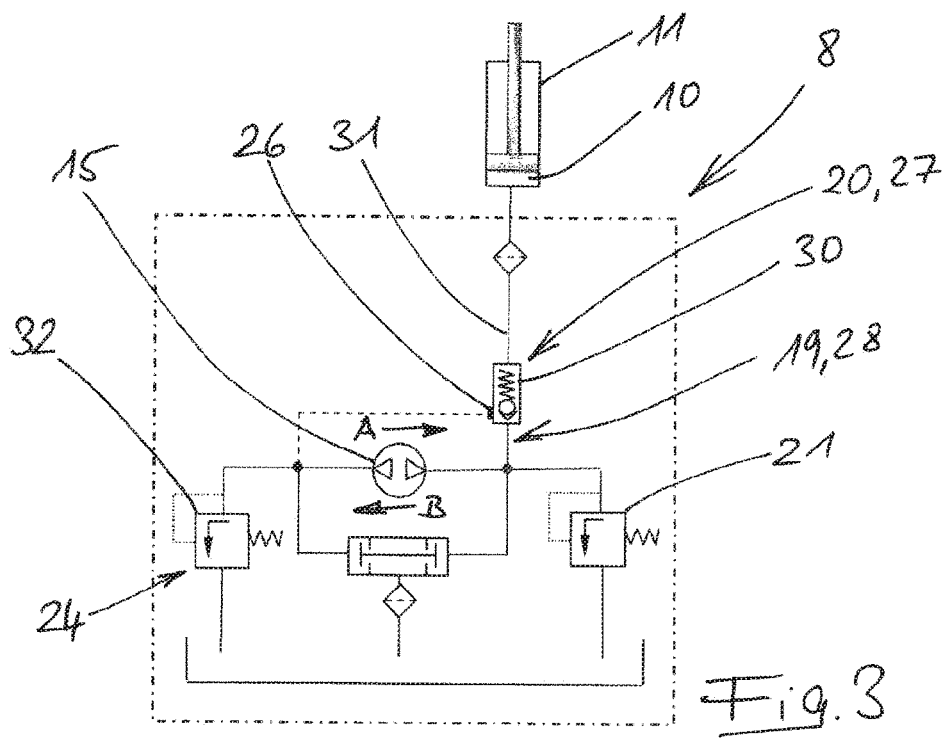
FIG. 3 shows a third preferred embodiment of a hydraulic level-adjusting device of a motor-vehicle chassis constructed according to the present invention.

The third embodiment of hydraulic level-adjusting device 8 of a motor-vehicle chassis 1 shown in FIG. 3 corresponds largely to that according to FIG. 2. However, throttle element 24 has the form of a pressure-limiting valve 32 here instead of an orifice.

Figure 4:
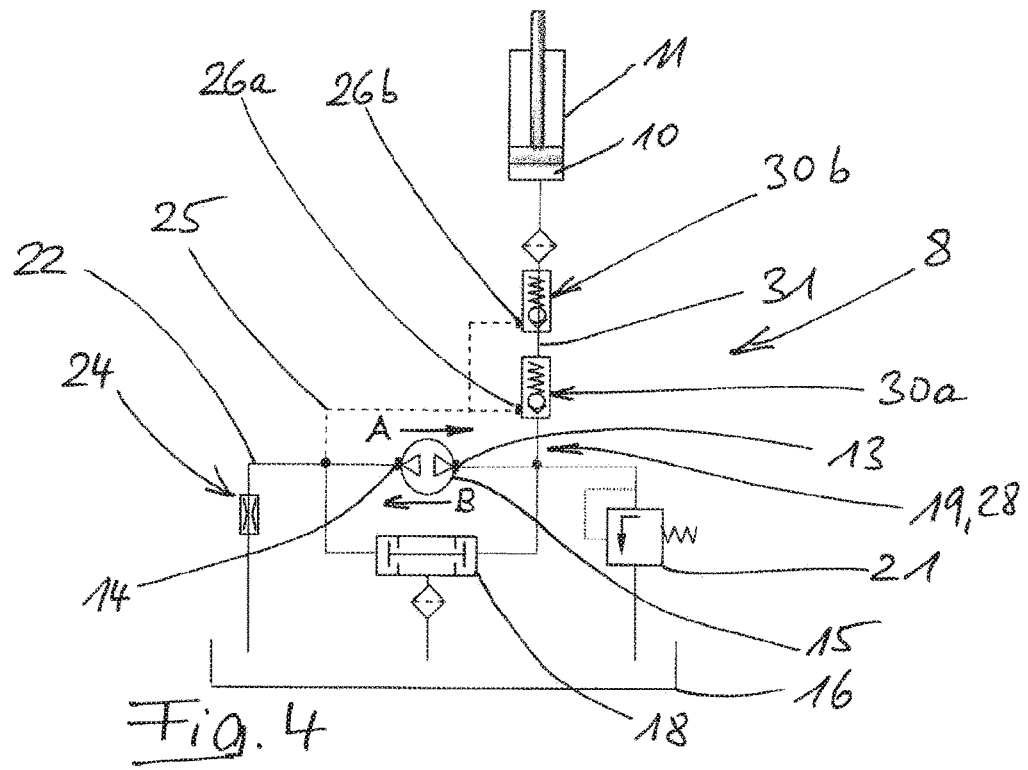
FIG. 4 shows a fourth preferred embodiment of a hydraulic level-adjusting device of a motor-vehicle chassis constructed according to the present invention.

The fourth embodiment of hydraulic level-adjusting device 8 of a motor-vehicle chassis 1 shown in FIG. 4 also corresponds largely to that according to FIG. 2. In this case, however, pilot-to-open check valve 30 disposed in hydraulic working line 31 is constructed in two stages with two individual valves 30a, 30b connected in series and having control ports 26a, 26b connected in parallel.

Figure 5:
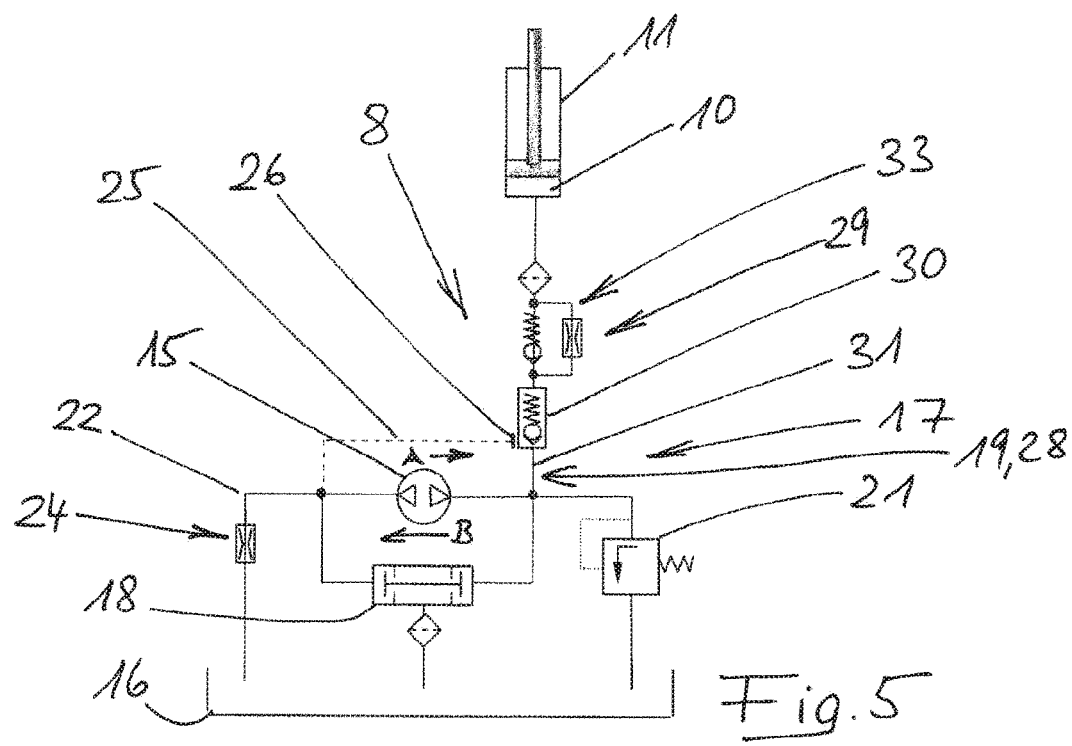
FIG. 5 shows a fifth preferred embodiment of a hydraulic level-adjusting device of a motor-vehicle chassis constructed according to the present invention.

The fifth embodiment of hydraulic level-adjusting device 8 of a motor-vehicle chassis 1 shown in FIG. 5 also corresponds largely to that according to FIG. 2. In this case, however, a throttle check valve 33 is provided in hydraulic working line 31, in series with pilot-to-open check valve 30 disposed therein. This permits unthrottled filling of working space 10 of linear actuator 11 during raising of motor-vehicle chassis 1 (delivery direction A of hydraulic pump 15), whereas the return flow of hydraulic fluid from working space 10 of linear actuator 11 into reservoir 16 is throttled during lowering of chassis 1 (delivery direction B of hydraulic pump 15). To this extent, throttle check valve 33 takes over the function of flow throttle 29 of hydraulic level-adjusting device 8 shown in FIG. 1.

Figure 6:
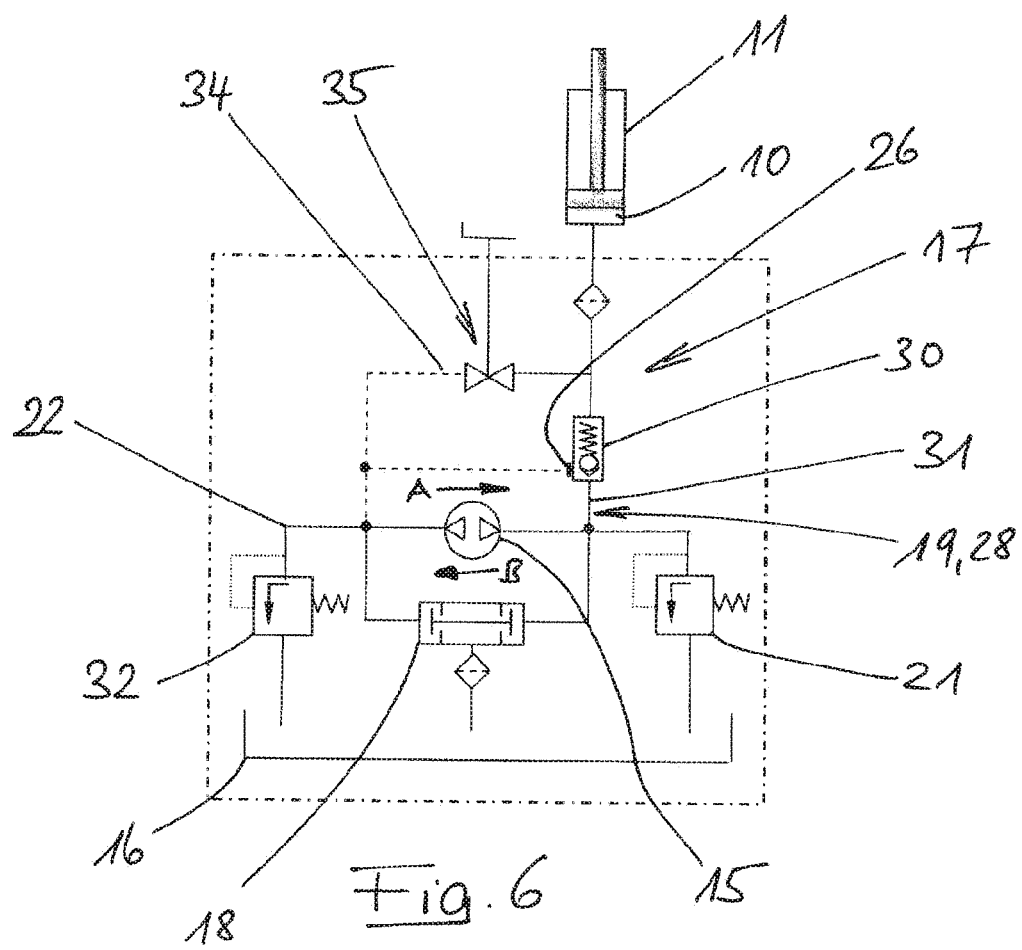
FIG. 6 shows a sixth preferred embodiment of a hydraulic level-adjusting device of a motor-vehicle chassis constructed according to the present invention.

The sixth embodiment of hydraulic level-adjusting device 8 of a motor-vehicle chassis 1 shown in FIG. 6 corresponds largely to that according to FIG. 3. In this case, however, line and valve arrangement 17 comprises an emergency drainage line 34, which places working space 10 of hydraulic linear actuator 11 in communication with discharge line 22 and in which a manually actuatable shutoff valve 35 is connected.

What is claimed is:

1. A motor vehicle chassis (1), comprising:
a base structure (5); and
a multiplicity of wheels (3), each connected therewith by way of a corresponding wheel suspension (4),
wherein each wheel suspension (4) has at least one spring (6) and wherein further a hydraulic level-adjusting device (8) is allocated at least to one wheel suspension (4), wherein:
the hydraulic level-adjusting device (8) comprises a reservoir (16) for hydraulic fluid, a hydraulic power pack (12) with a hydraulic pump (15) driven by an electric motor (M) and having two pump ports (13, 14), a single-acting hydraulic linear actuator (11) as well as a line and valve arrangement (17) placing the reservoir (16), the hydraulic pump (15) and the linear actuator (11) in communication with one another;
to raise the base structure (5), the working space (10) of the linear actuator (11) can be pressurized by the hydraulic pump (15), for which purpose a first pump port (13), by way of a filling line (19) with a filling check valve (20) disposed therein, is in communication with the working space (10) of the hydraulic linear actuator (11);
the hydraulic power pack (12) is reversible, with a reversible delivery direction (A, B) between the two pump ports (13, 14);
the two pump ports (13, 14) are in communication with the reservoir (16) by way of a shuttle valve (18);
the second pump port (14) is in communication with the reservoir (16) by way of a discharge line (22) with a throttle unit (24) disposed therein;
a control line (25) places the control port (26) of a pilot-to-open drainage check valve (27), which is disposed in a drainage line (28) placing the working space (10) of the hydraulic linear actuator (11) in communication with the reservoir (16), in communication with the discharge line (22) between the second pump port (14) and the throttle unit (24);
wherein the throttle unit comprises an orifice; and
wherein the shuttle valve is constructed to be self-sufficient, without any activation imposed by external energy, and wherein the shuttle valve does not have any shut-off position, and so at least one of the two pump ports is constantly in communication with the reservoir by way of the shuttle valve.

2. The motor-vehicle chassis of claim 1, wherein a flow throttle (29) is disposed in the drainage line (28).

3. The motor-vehicle chassis of claim 1, wherein a hydraulic working line (31) forms both a portion of the filling line (19) and a portion of the drainage line (28), in which case a pilot-to-open check valve (30) disposed in the hydraulic working line (31) forms both the filling check valve (20) and the pilot-to-open drainage check valve (27).

4. The motor-vehicle chassis of claim 3, wherein the pilot-to-open check valve (30) disposed in the hydraulic working line (31) is constructed in two stages, with two individual valves (30a, 30b) connected in series and having control ports (26a, 26b) connected in parallel.

5. The motor-vehicle chassis of claim 3, wherein the pilot-to-open check valve (30) disposed in the hydraulic working line (31) is connected in series with a throttle check valve (33).

6. The motor-vehicle chassis of claim 1, wherein the line and valve arrangement (17) comprises an emergency drainage line (34), which places the working space (10) of the hydraulic linear actuator (11) in communication with the discharge line (22) and in which a manually actuatable shutoff valve (35) is connected.

7. The motor-vehicle chassis of claim 1, wherein the hydraulic level-adjusting device (8) is disposed completely on the wheel suspension (4).

8. The motor-vehicle chassis of claim 1, wherein the pilot line and the discharge line are free of hydraulically active elements.

9. A motor vehicle chassis (1), comprising:
a base structure (5); and
a multiplicity of wheels (3), each connected therewith by way of a corresponding wheel suspension (4),
wherein each wheel suspension (4) has at least one spring (6) and wherein further a hydraulic level-adjusting device (8) is allocated at least to one wheel suspension (4), wherein:
the hydraulic level-adjusting device (8) comprises a reservoir (16) for hydraulic fluid, a hydraulic power pack (12) with a hydraulic pump (15) driven by an electric motor (M) and having two pump ports (13, 14), a single-acting hydraulic linear actuator (11) as well as a line and valve arrangement (17) placing the reservoir (16), the hydraulic pump (15) and the linear actuator (11) in communication with one another;
to raise the base structure (5), the working space (10) of the linear actuator (11) can be pressurized by the hydraulic pump (15), for which purpose a first pump port (13), by way of a filling line (19) with a filling check valve (20) disposed therein, is in communication with the working space (10) of the hydraulic linear actuator (11);
the hydraulic power pack (12) is reversible, with a reversible delivery direction (A, B) between the two pump ports (13, 14);
the two pump ports (13, 14) are in communication with the reservoir (16) by way of a shuttle valve (18);
the second pump port (14) is in communication with the reservoir (16) by way of a discharge line (22) with a throttle unit (24) disposed therein;
a control line (25) places the control port (26) of a pilot-to-open drainage check valve (27), which is disposed in a drainage line (28) placing the working space (10) of the hydraulic linear actuator (11) in communication with the reservoir (16), in communication with the discharge line (22) between the second pump port (14) and the throttle unit (24),
wherein a hydraulic working line (31) forms both a portion of the filling line (19) and a portion of the drainage line (28), in which case a pilot-to-open check valve (30) disposed in the hydraulic working line (31) forms both the filling check valve (20) and the pilot-to-open drainage check valve (27), and wherein the pilot-to-open check valve (30) disposed in the hydraulic working line (31) is constructed in two stages, with two individual valves (30a, 30b) connected in series and having control ports (26a, 26b) connected in parallel.

10. A motor vehicle chassis (1), comprising:
a base structure (5); and
a multiplicity of wheels (3), each connected therewith by way of a corresponding wheel suspension (4),
wherein each wheel suspension (4) has at least one spring (6) and wherein further a hydraulic level-adjusting device (8) is allocated at least to one wheel suspension (4), wherein:
the hydraulic level-adjusting device (8) comprises a reservoir (16) for hydraulic fluid, a hydraulic power pack (12) with a hydraulic pump (15) driven by an electric motor (M) and having two pump ports (13, 14), a single-acting hydraulic linear actuator (11) as well as a line and valve arrangement (17) placing the reservoir (16), the hydraulic pump (15) and the linear actuator (11) in communication with one another;
to raise the base structure (5), the working space (10) of the linear actuator (11) can be pressurized by the hydraulic pump (15), for which purpose a first pump port (13), by way of a filling line (19) with a filling check valve (20) disposed therein, is in communication with the working space (10) of the hydraulic linear actuator (11);
the hydraulic power pack (12) is reversible, with a reversible delivery direction (A, B) between the two pump ports (13, 14);
the two pump ports (13, 14) are in communication with the reservoir (16) by way of a shuttle valve (18);
the second pump port (14) is in communication with the reservoir (16) by way of a discharge line (22) with a throttle unit (24) disposed therein;
a control line (25) places the control port (26) of a pilot-to-open drainage check valve (27), which is disposed in a drainage line (28) placing the working space (10) of the hydraulic linear actuator (11) in communication with the reservoir (16), in communication with the discharge line (22) between the second pump port (14) and the throttle unit (24),
wherein the line and valve arrangement (17) comprises an emergency drainage line (34), which places the working space (10) of the hydraulic linear actuator (11) in communication with the discharge line (22) and in which a manually actuatable shutoff valve (35) is connected.

* * * * *